Patented May 30, 1950

2,509,320

UNITED STATES PATENT OFFICE 2,509,320

MACHINE FOR PACKETING SMALL MEASURED QUANTITIES OF SEED OR GRANULAR OR POWDERED MATERIALS IN PAPER ENVELOPES

Arthur Ronald Smith, Birmingham, and George Arthur Lee and Cyril John Hopkins, Cuffley, England Application October 3, 1946, Serial No. 700,904
In Great Britain October 10, 1945

3 Claims. (Cl. 226—49)

This invention has for its object to provide a simple and convenient machine for packeting small measured quantities of seeds or other granular or powdered materials in paper envelopes or other like containers.

In the accompanying sheets of explanatory drawings—

Figure 1:
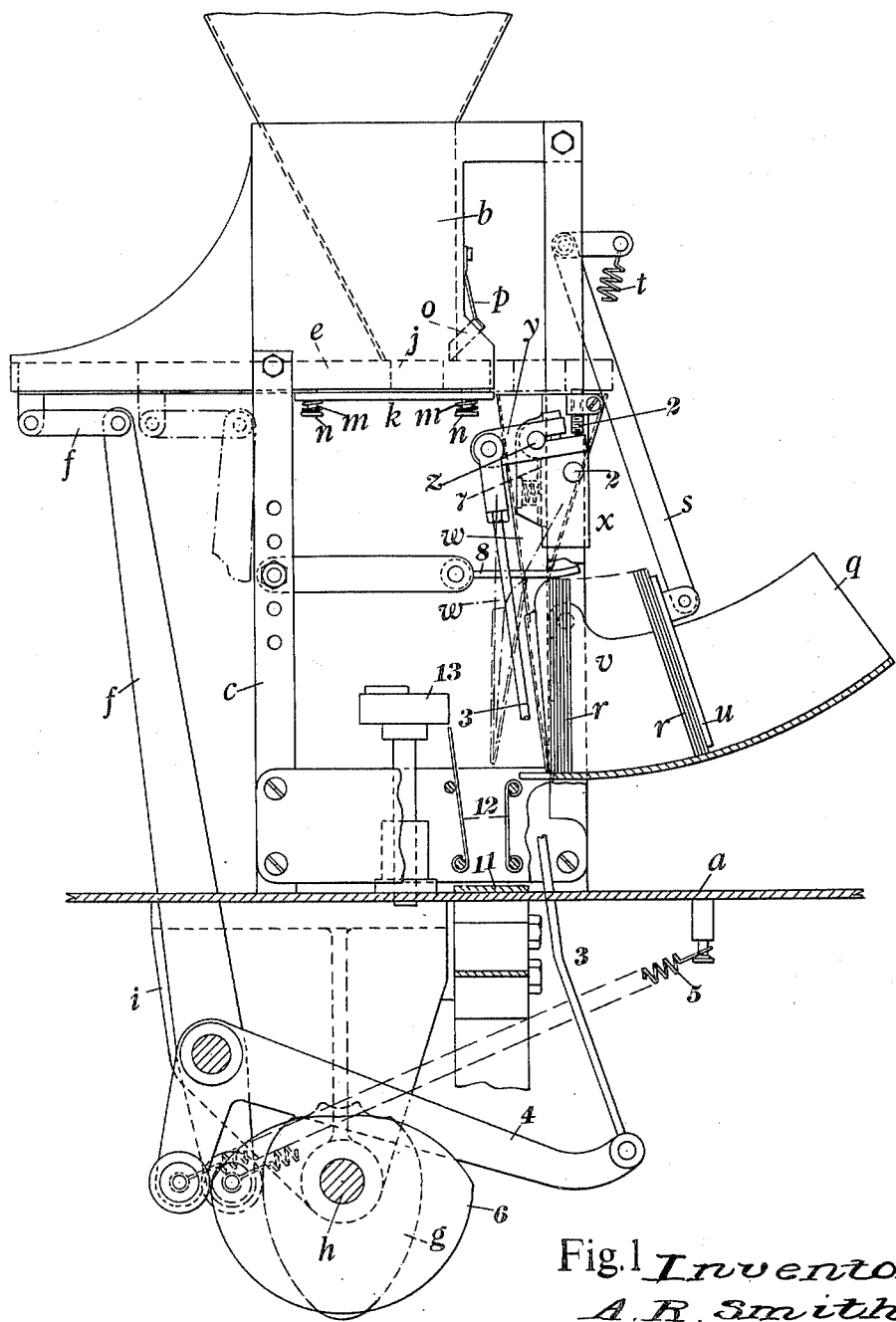
Figure 1 is a part sectional side view, and Figure 2 a part sectional end view, of a seed-packeting machine constructed in accordance with the invention.
Figures 2, 4:
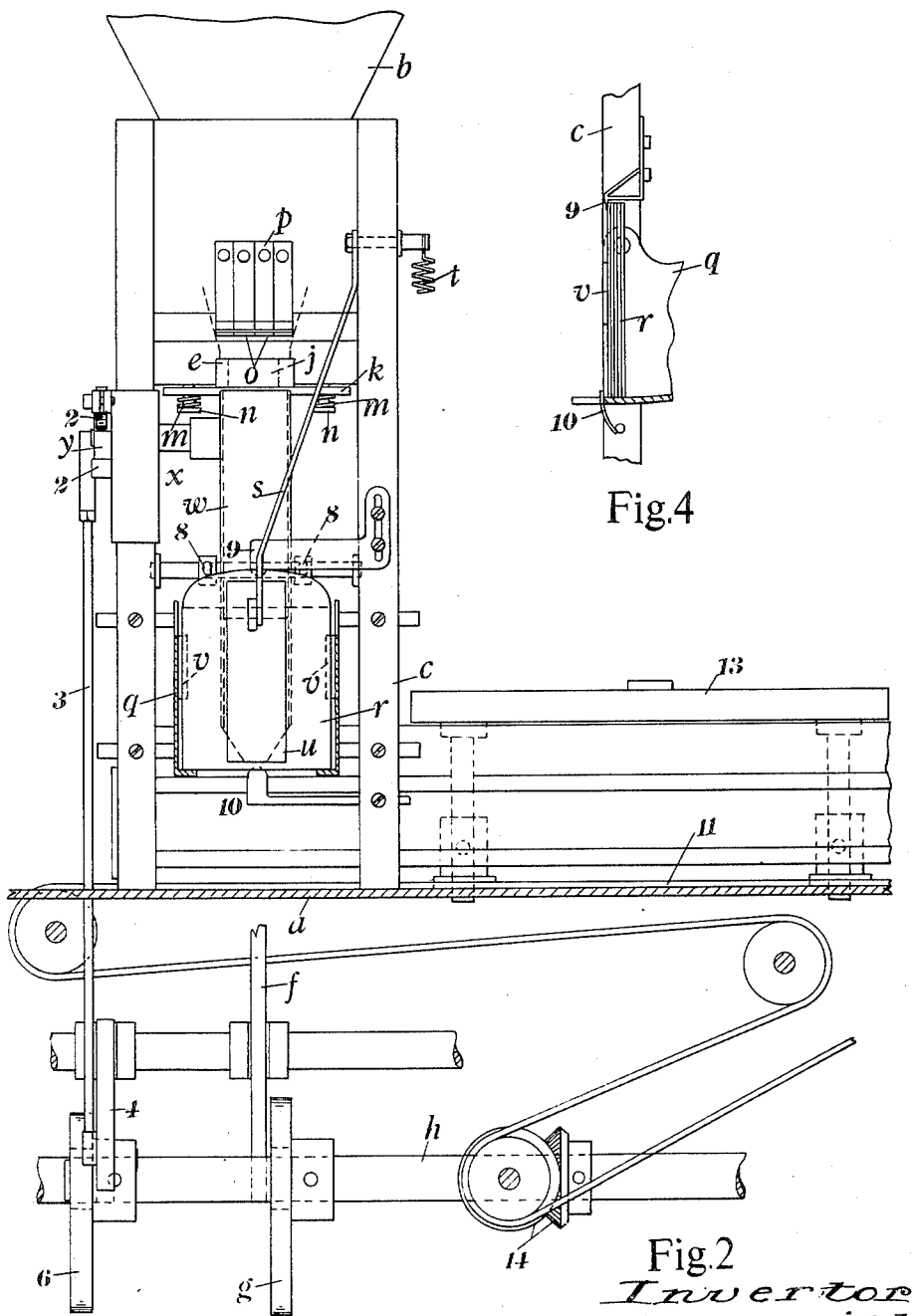
Figure 4 is a fragmentary sectional side view illustrating a detail.
Figure 3:
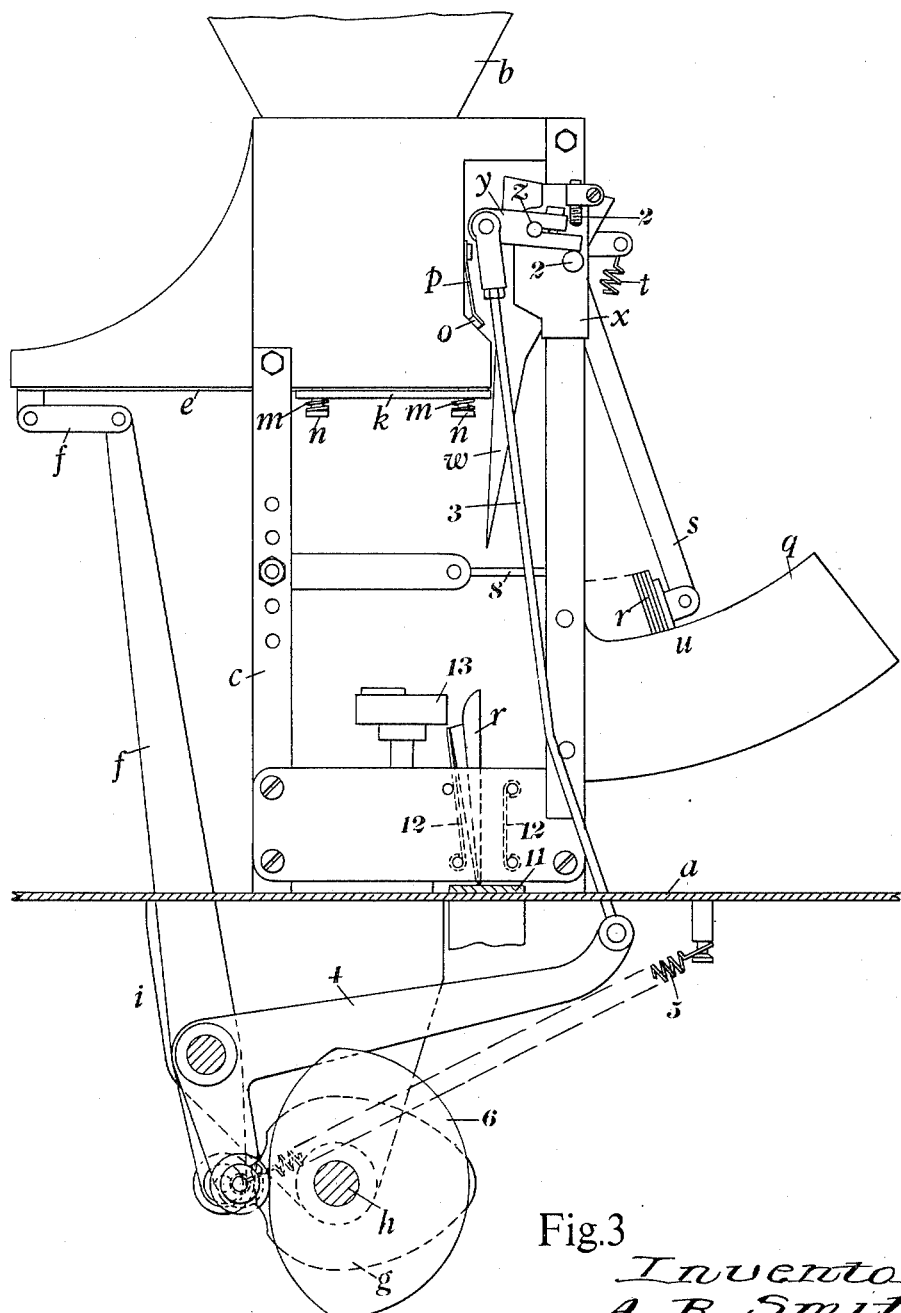
Figure 3 is a similar view to Figure 1 showing the vertically slidable nozzle and associated parts in different positions.

In carrying the invention into effect as shown, we mount above a base $a$, a hopper $b$ for containing a supply of seed, the hopper being carried by a supporting framework $c$ on the base. Arranged beneath the open lower end of the hopper $b$ is a horizontal slide $e$ in the form of a plate having one end connected to a link and lever mechanism $f$ through which reciprocatory movements can be imparted to the slide from a rotary cam $g$, the latter being mounted on the main driving shaft $h$ of the machine which is carried by brackets as $i$ on the underside of the base $a$. The slide $e$ is formed with a hole $j$ for receiving the desired quantity of seed from the hopper $b$, and is held in close contact with the lower open end of the hopper by a supporting plate $k$, the latter being pressed against the underside of the slide by springs $m$ on studs $n$ which connect the supporting plate to the adjacent part of the framework $c$. Preferably the cam $g$ is shaped as shown so that in addition to imparting to and fro movements to the slide $e$ it also imparts thereto at appropriate intervals agitating movements which serve to shake the seed into the hole $j$. When the slide $e$ occupies the position shown in full lines in Figure 1 in which the hole $j$ lies beneath the open lower end of the hopper $b$, the lower end of the hole is closed by the supporting plate $k$, and this enables the seed entering the hole from the hopper to be carried by the slide when the latter is subsequently moved to the discharge position shown in chain dotted lines in Figure 1. In this position the forward end of the slide $e$ extends from one side of the hopper $b$, and the lower end of the hole $j$ is no longer closed by the supporting plate $k$. Consequently the seed in hole $j$ is free to fall. During the movement of the slide $e$ to its discharge position, surplus seed is removed from the upper surface of the slide by fingers $o$ extending through an opening in the side of the hopper $b$ from which the forward end of the slide $e$ can extend, these fingers being attached to the said side by spring strips $p$ which serve to hold the fingers in resilient contact with the upper surface of the slide.

At one side of the framework $c$, and in a position below the hopper $b$, is secured a holder $q$ for a supply of paper envelopes $r$. This holder $q$ is of channel cross section, and is preferably of arcuate form in the direction of its length. The envelopes $r$ are arranged in the holder $q$ in contact with each other, and with their flaps open and extending beyond the upper side of the holder, the arrangement being such that the envelopes can be fed along the holder towards its inner end with their flapless faces innermost. Feeding of the envelopes $r$ along the holder $q$ is effected by a lever $s$ which at its upper end is loaded by a spring $t$ and is pivoted to the framework $c$, and which at its lower end is pivoted to a plate $u$ adapted to press on the outer end of the stack of envelopes in the holder. Retention of the envelopes $r$ in the holder $q$ is effected by a pair of vertical abutments $v$ at the inner end of the holder, the abutments being such that the envelopes can be extracted individually from the inner end of the holder as hereinafter described.

Arranged between the inner end of the holder $q$ and the hopper $b$ is a nozzle $w$ which at its upper end is adapted to receive the seeds discharged by the slide $e$, and at its lower end is adapted to enter the foremost envelope $r$. The nozzle $w$ is pivotally supported by a vertically movable slide $x$ mounted on an adjacent member of the framework $c$, and is arranged so that after being caused to enter an envelope $r$ (as shown in full lines in Figure 1) it can be rocked about its pivot axis (into the position shown in chain-dotted lines in Figure 1) to extract the envelope from the holder $q$. The slide $x$ and nozzle $w$ are operable by a lever $y$ which is secured to the nozzle pivot $z$, and which at one end lies between a pair of stops $2$ on the slide, one or each of these stops being adjustable. The other end of the lever $y$ is connected by a link $3$ to another lever $4$ which is loaded by a spring $5$, and which is operable by a second cam $6$ on the shaft $h$ above mentioned. The arrangement is such that movement of the lever $y$ first rocks the nozzle $w$ to one or the other of its limit positions, determined by contact of the lever with one or the other of the stops $2$, and continued movement causes the slide $x$ and the nozzle to move together in the upward or downward direction.

Preferably and as shown the slide x is provided with a spring loaded friction piece 7 which serves, by contact with the member of the framework c carrying the slide, to ensure rocking of the nozzle w prior to each vertical movement of the slide x.

To detach the extracted envelopes r from the nozzle w there is mounted on the framework c a stripper comprising a pair of parallel arms 8 adapted, by contact with the upper edge of the flap on each envelope extracted from the holder q by the nozzle, to arrest upward movement of the envelopes with the nozzle. Also there are mounted on the framework c a pair of stop pieces 9, 10 which serve by contact respectively with the lower edge and the flap of the leading envelope r in the holder q to facilitate entrance of the nozzle w into the envelope, the stop piece 9 being adjustable to suit envelopes of different sizes, and being shaped to guide the nozzle into the envelope if, due to maladjustment, the nozzle comes into contact with this stop piece.

The arrangement of the parts above described is such that in each cycle of operations of the machine, the vertically movable slide x moves downwardly, causing the nozzle w to engage the leading envelope r in the holder q. The horizontally movable slide e then transfers a quantity of seed from the hopper b to the nozzle w through which the seeds enter the envelopes r engaged by the nozzle. On retraction of the horizontally movable slide e, the nozzle w is first rocked in the direction for extracting the charged envelope r from the nozzle, and is then moved upwardly with the slide x. During this action the stripper arms detach the charged envelope r from the nozzle w and allow it to fall towards the base a. Simultaneously the stack of envelopes r in the holder q is fed forward, and the cycle of operations is automatically repeated until each of the envelopes has been charged.

Carried by the base a is a small conveyor 11 of the endless-band type which receives the charged envelopes detached from the nozzle w and carries them to a sealing position. At opposite sides of the upper part of the conveyor 11, are mounted a pair of plates 12 which form with this part of the conveyor a guide channel along which the charged envelopes can be moved by the conveyor in a substantially vertical position with their flaps uppermost. At one side of this guide channel is arranged a damping pad 13 against which the gummed flaps of the charged envelopes can be pressed by the attendant, who then closes the flaps, the charged and sealed envelopes being subsequently deposited by the attendant in any convenient receptacle. The conveyor 11 is actuated through any suitable mechanism, such as bevel gearing 14 from the driving shaft h above mentioned.

By this invention we are able to provide a seed-packeting machine in a very simple and convenient form. The invention may, however, be employed for packing other granular or powdered materials in paper envelopes or like containers. Moreover, the invention is not restricted to the example described as subordinate details of construction may be varied to suit different requirements.

Having thus described our invention, what we claim as new and desire to secure by Letters Patent is:

1. A machine for packeting small measured quantities of seed or other granular or powdered material in paper envelopes or like containers, comprising in combination a hopper for the material to be packeted, a slide for discharging the material from the hopper in measured quantities, a holder for a plurality of the containers to be charged with material from the hopper, a pivotal and vertically movable nozzle arranged to enter each container in turn, charge the entered container with material from the slide, and extract the charged container from the holder, means for moving the slide between positions in which it serves to receive material from the hopper and to discharge the received material into the nozzle, a second and vertically movable slide for moving the nozzle into and out of the containers, a lever for imparting pivotal movements to the nozzle and thereby causing the nozzle to extract the charged containers from the holder, and means for imparting vertical movements in opposite directions to the second slide through the medium of the lever so that reversal of motion of the second slide is preceded by pivotal movement of the nozzle.

2. A machine for packeting small measured quantities of seed or other granular or powdered material in paper envelopes or like containers, comprising in combination a hopper for the material to be packeted, a slide for discharging the material from the hopper in measured quantities, a holder for a plurality of the containers to be charged with material from the hopper, a pivotally and vertically movable nozzle arranged to enter each container in turn, charge the entered container with material from the slide, and extract the charged container from the holder, means for moving the slide between positions in which it serves to receive material from the hopper and to discharge the received material into the nozzle, a rotary cam for actuating said means, a second slide on which the nozzle is pivotally mounted, and which is vertically movable for moving the nozzle into and out of the containers, a pair of stops on the second slide, a lever for imparting pivotal movements to the nozzle and thereby causing the nozzle to extract the charged containers from the holder, the said lever being secured to the nozzle and having one end movable between the stops so that the nozzle is rockable about its pivot axis by the lever through a distance determined by the stops, a link-and-lever mechanism for imparting vertical movements in opposite directions to the second slide through the medium of the lever so that reversal of motion of the second slide is preceded by pivotal movement of the nozzle, the said link-and-lever mechanism being connected to the end of the lever remote from that movable between the stops, and a second rotary cam for actuating the said mechanism.

3. A machine as claimed in claim 2, in which the first mentioned cam is also shaped to impart agitating movements to the associated slide when the latter occupies a position for receiving material from the hopper.

ARTHUR RONALD SMITH.
GEORGE ARTHUR LEE.
CYRIL JOHN HOPKINS.

REFERENCES CITED

The following references are of record in the file of this patent:

UNITED STATES PATENTS

| Number | Name | Date |
| --- | --- | --- |
| 676,048 | Price | June 11, 1901 |
| 2,376,289 | Stenglein | May 15, 1945 |